(12) United States Patent
Kusa

(10) Patent No.: US 8,251,048 B2
(45) Date of Patent: Aug. 28, 2012

(54) EVAPORATED FUEL CONTROLLING APPARATUS FOR ALL TERRAIN VEHICLE

(75) Inventor: Mitsuo Kusa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 367 days.

(21) Appl. No.: 12/696,569

(22) Filed: Jan. 29, 2010

(65) Prior Publication Data

US 2010/0224172 A1 Sep. 9, 2010

(30) Foreign Application Priority Data

Mar. 3, 2009 (JP) .................................. 2009-049086

(51) Int. Cl.
*F02M 33/04* (2006.01)
*F02M 33/02* (2006.01)
(52) U.S. Cl. ....................................... 123/519; 123/518
(58) Field of Classification Search .................. 123/520, 123/519, 518, 516; 180/69.4, 218, 219, 225
See application file for complete search history.

(56) References Cited

U.S. PATENT DOCUMENTS

2005/0173918 A1* 8/2005 Eguchi et al. ................. 280/834

FOREIGN PATENT DOCUMENTS

| JP | 53-131119 U | 10/1978 |
| JP | 56-053973 A | 5/1981 |
| JP | 3-29573 Y2 | 6/1991 |

* cited by examiner

*Primary Examiner* — Mahmoud Gimie
(74) *Attorney, Agent, or Firm* — Westerman, Hattori, Daniels & Adrian, LLP

(57) ABSTRACT

An evaporated fuel controlling apparatus for an all terrain vehicle can avoid the influence of disturbance and can be disposed efficiently. The evaporated fuel controlling apparatus includes a canister adapted to absorb evaporated fuel generated from a fuel tank, a purge path adapted to connect the canister and an intake system of an engine to each other, and a purge controlling section adapted to control a flow rate of the evaporated fuel to be supplied from the canister to the intake system of the engine through the purge path. At least the canister from among the canister, purge path and purge controlling section is mounted on a vehicle body front frame FrF which supports a steering mechanism.

9 Claims, 9 Drawing Sheets

EVAPORATED FUEL CONTROLLING APPARATUS FOR ALL TERRAIN VEHICLE

TECHNICAL FIELD

An evaporated fuel controlling apparatus is disclosed which is applied to an all terrain vehicle such as an ATV (All Terrain Vehicle) or the like.

BACKGROUND OF THE INVENTION

An evaporated fuel controlling apparatus is conventionally known wherein evaporated fuel generated from a fuel tank is absorbed by a canister and the absorbed evaporated fuel is purged to an intake system of an internal combustion engine. Where such an evaporated fuel controlling apparatus as just described is disposed on a small vehicle wherein the layout space is restricted, a canister is disposed between an under bracket and an upper bracket of a fork of a motorcycle (refer to, for example, Patent Document 1), or a canister is disposed on a down tube of a motorcycle (refer to, for example, Japanese Utility Model Laid-Open No. Sho-53-131119, or a canister is disposed on a down tube of a motorcycle (refer to, for example, Japanese Patent Laid-Open No. Sho-56-53973 and Japanese Utility Model Publication No. Hei 3-29573.

SUMMARY OF THE INVENTION

However, where it is intended to apply such a disposition structure as described above to an all terrain vehicle having three or more wheels such as an ATV (All Terrain Vehicle), since a frame structure and a driving situation are different between an all terrain vehicle and a motorcycle, the disposition structure cannot be disposed on a blank space while avoiding the influence of disturbance such as mud on the evaporated fuel controlling apparatus.

For example, while a suspension structure in a motorcycle is formed comparatively small, in an all terrain vehicle, a steering wheel exists on the outer side in a vehicle widthwise direction and a suspension stroke of a wheel becomes long. Therefore, there is no blank space in which an evaporated fuel controlling apparatus can be disposed in the proximity of the steering wheel. Further, in the case of shaft-type four-cycle vehicle, since a driving shaft extends in a forward and rearward direction, the disposition space for parts decreases. Further, layout of parts needs to take driving on irregular ground into consideration.

An evaporated fuel controlling apparatus for an all terrain vehicle is provided which can avoid the influence of disturbance and can be disposed efficiently.

An evaporated fuel controlling apparatus for an all terrain vehicle is provided which includes an engine and a fuel injection system for supplying fuel from a fuel tank to the engine and wherein a steering mechanism including a handle bar and a steering shaft is supported on a vehicle body front frame at a front portion of a vehicle body, the all terrain vehicle having at least three wheels, configured such that the evaporated fuel controlling apparatus includes a canister adapted to absorb evaporated fuel generated from the fuel tank, a purge path adapted to connect the canister and an intake system of the engine to each other, and a purge controlling section adapted to control a flow rate of the evaporated fuel to be supplied from the canister to the intake system of the engine through the purge path. At least the canister from among the canister, purge path and purge controlling section is mounted on the vehicle body front frame which supports the steering mechanism.

Since at least the canister from among the canister, purge path and purge controlling section is mounted on the vehicle body front frame which supports the steering mechanism, a space around the steering mechanism can be utilized to dispose the evaporated fuel controlling apparatus efficiently while the influence of disturbance on the evaporated fuel controlling apparatus is avoided. Further, the necessity for a mounting member for exclusive use is eliminated and the number of parts can be reduced. Furthermore, a space around the vehicle body front frame can be utilized also to enhance the mountability and the degree of freedom in layout of the evaporated fuel controlling apparatus.

In the configuration described above, the vehicle body front frame may include a down frame section extending downwardly toward the front side of the vehicle from a steering supporting portion for supporting the steering shaft, and at least the canister may be mounted on the down frame section. According to the configuration, since at least the canister is mounted on the down frame section which the vehicle body front frame has and which extends downwardly toward the front side of the vehicle, the necessity for a mounting member for exclusive use is eliminated and the number of parts can be reduced. Further, a space around the down frame section can be utilized to dispose the evaporated fuel controlling apparatus efficiently while the influence of disturbance on the evaporated fuel controlling apparatus is avoided. Consequently, it is possible to achieve enhancement of the mountability and the degree of freedom in layout of the evaporated fuel controlling apparatus.

Further, in the configuration described above, the vehicle body front frame may include a down frame section extending downwardly toward the rear side of the vehicle from a steering supporting portion for supporting the steering shaft, and at least the canister may be mounted on the down frame section. According to the configuration, the necessity for a mounting member for exclusive use is eliminated and the number of parts can be reduced. Further, a space around the down frame section can be utilized to dispose the evaporated fuel controlling apparatus efficiently while the influence of disturbance on the evaporated fuel controlling apparatus is avoided. Consequently, it is possible to achieve enhancement of the mountability and the degree of freedom in layout of the evaporated fuel controlling apparatus.

Further, in the configuration described above, the down frame section may include a pair of left and right down pipes and a cross member for connecting the down pipes to each other, and at least the canister may be mounted on the cross member. According to the configuration, the necessity for a mounting member for exclusive use is eliminated and the number of parts can be reduced. Further, a space around the cross member can be utilized to dispose the evaporated fuel controlling apparatus efficiently while the influence of disturbance on the evaporated fuel controlling apparatus is avoided. Consequently, it is possible to achieve enhancement of the mountability and the degree of freedom in layout of the evaporated fuel controlling apparatus. Further, since the cross member has high rigidity, the supporting strength of the canister can be assured sufficiently with a simple and easy mounting structure.

Further, in the configuration described above, the purge controlling section may be mounted on the vehicle body front frame at a location higher than the canister. According to the configuration, the necessity for a mounting member for exclusive use is eliminated and the number of parts can be reduced. Further, a space around the vehicle body front frame can be utilized to dispose the evaporated fuel controlling apparatus efficiently while the influence of disturbance on the evaporated fuel controlling apparatus is avoided. Consequently, it is possible to achieve enhancement of the mountability and the degree of freedom in layout of the purge controlling section. Further, it is possible to introduce evaporated fuel from the canister into the purge controlling section readily, and another part for sucking out the evaporated fuel from the canister is unnecessary.

Further, in the configuration described above, a radiator may be disposed on the vehicle body front frame and at least the canister may be mounted on a frame member positioned rearward of the radiator. According to the configuration, the necessity for a mounting member for exclusive use is eliminated and the number of parts can be reduced. Further, a space rearward of the radiator can be utilized to dispose the evaporated fuel controlling apparatus efficiently while the influence of disturbance on the evaporated fuel controlling apparatus is avoided. Consequently, it is possible to achieve enhancement of the mountability and the degree of freedom in layout of the evaporated fuel controlling apparatus. Further, disturbance from the front of the vehicle body is interrupted by the radiator, and the influence of the disturbance on the evaporated fuel controlling apparatus can be avoided effectively.

Further, in the configuration described above, a radiator may be disposed on the vehicle body front frame and at least the canister may be mounted on a frame member positioned forward of the radiator. According to the configuration, the necessity for a mounting member for exclusive use is eliminated and the number of parts can be reduced. Further, a space forward of the radiator can be utilized to dispose the evaporated fuel controlling apparatus efficiently while the influence of disturbance on the evaporated fuel controlling apparatus is avoided. Consequently, it is possible to achieve enhancement of the mountability and the degree of freedom in layout of the evaporated fuel controlling apparatus.

Further, in the configuration described above, at least the canister may be mounted on a frame member positioned rearward of the steering shaft. According to the configuration, a mounting member for exclusive use is unnecessary, and the number of parts can be reduced and besides the mountability is enhanced.

Further, in the configuration described above, at least the canister may be mounted on the frame member in the proximity of the intake system of the engine rearward of the steering shaft. According to the configuration, the canister can be disposed near to the intake system of the engine, and the purge path can be made short and the evaporated fuel can be fed to the intake system efficiently.

Further, in the configuration described above, at least the canister may be mounted on the frame member between the steering shaft and the fuel tank. According to the configuration, it is possible to avoid the influence of disturbance on the evaporated fuel controlling apparatus effectively.

Further, in the configuration described above, at least the canister may be disposed at a position higher than a lower end of a seat on which a rider is to be seated. According to the configuration, at least the canister can be disposed at a high position substantially the same as that of the seated position of a rider, and it is possible to avoid the influence of disturbance on the evaporated fuel controlling apparatus effectively.

Further, in the configuration described above, the evaporated fuel controlling apparatus may be disposed at a higher position than a depth of water, in which the vehicle can travel, defined by an exit of an exhaust pipe connected to the engine or the intake system of the engine. According to the configuration, the influence of disturbance on the evaporated fuel controlling apparatus can be avoided while the depth of water, through which the vehicle can travel, of the all terrain vehicle is secured sufficiently.

Since the canister from among the canister, purge path and purge controlling section is mounted on a vehicle body front frame which supports a steering mechanism, the evaporated fuel controlling apparatus can be disposed efficiently while avoiding the influence of disturbance on the evaporated fuel controlling apparatus utilizing a space around the steering mechanism.

Further, since the vehicle body front frame includes a down frame section extending downwardly to the vehicle front side from a steering supporting portion for supporting a steering shaft and at least the canister is mounted on the down frame section, a special purpose mounting member is unnecessary.

Further, since the vehicle body front frame includes a down frame section extending downwardly to the vehicle rear side from a steering supporting portion for supporting a steering shaft and at least the canister is mounted on the down frame section, a special purpose mounting member is unnecessary.

Further, since the down frame section includes a pair of left and right down pipes and a cross member for connecting the down pipes and at least the canister is mounted on the cross member, a special purpose mounting member is unnecessary and the supporting strength of the canister can be sufficiently secured with a simple mounting structure.

Further, since the purge controlling section is mounted on the vehicle body front frame higher than the canister, any other member for absorbing evaporated fuel from the canister is unnecessary.

Further, since a radiator is disposed on the vehicle body front frame and at least the canister is mounted on a frame member positioned rearward of the radiator, a special purpose mounting member is unnecessary and the evaporated fuel controlling apparatus can be disposed utilizing a space rearward of the radiator. Further, disturbance from a front of a vehicle is blocked by the radiator and the influence of disturbance on the evaporated fuel controlling apparatus can be effectively avoided.

Further, since a radiator is disposed on the vehicle body front frame and at least the canister is mounted on a frame member positioned forwardly with respect to the radiator, a special purpose mounting member is unnecessary and the evaporated fuel controlling apparatus can be disposed utilizing a space forward of the radiator.

Further, since at least the canister is mounted on a frame member positioned rearward of the steering shaft, a special purpose mounting member may not be provided.

Or, since at least the canister is mounted on a frame member in the proximity of intake system of the engine rearward of the steering shaft, the canister can be disposed in a juxtaposed relationship with an intake system of the engine and the purge path is configured short to efficiently send evaporated fuel to the intake system.

Since at least the canister is mounted on a frame member between the steering shaft and the fuel tank, the influence of disturbance on the evaporated fuel controlling apparatus can be effectively avoided.

Since at least the canister is disposed at a position higher than the lower end of the seat on which the rider is to be seated, at least the canister can be disposed at a position having height substantially the same as a seating position of the rider and the influence of disturbance on the evaporated fuel controlling apparatus can be effectively avoided.

Further, the evaporated fuel controlling apparatus may be disposed on a higher position than a depth of water, through which the vehicle can travel, defined by an exit of an exhaust pipe connected to the engine or the intake system of the engine. With the configuration, the influence of disturbance on the evaporated fuel controlling apparatus can be avoided while the depth of water, through which the vehicle can travel, of an all terrain vehicle is secured sufficiently.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
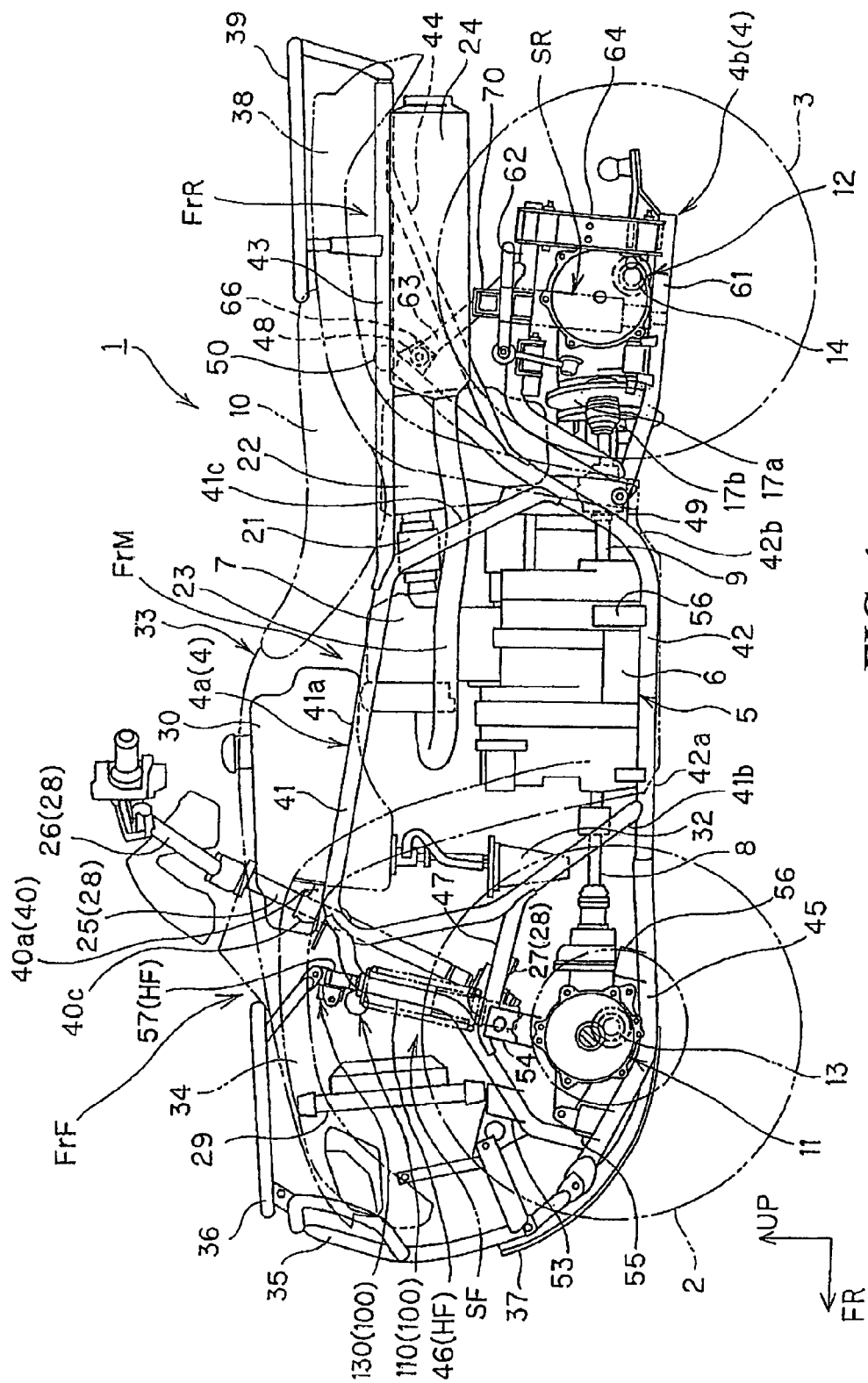
FIG. 1 is a side elevational view of a saddle type vehicle in which an evaporated fuel controlling apparatus according to a first embodiment of the present invention is incorporated.

In the following, embodiments of the present invention are described with reference to the accompanying drawings. It is to be noted that, in the description, representations of directions such as forward, rearward, leftward, rightward, upward and downward directions are given with reference to a vehicle body. Further, in the drawings, an arrow mark FR represents the forward direction of a vehicle body, another arrow mark LH represents the leftward direction of the vehicle body, and a further arrow mark UP represents the upward direction of the vehicle body.

Figure 2:
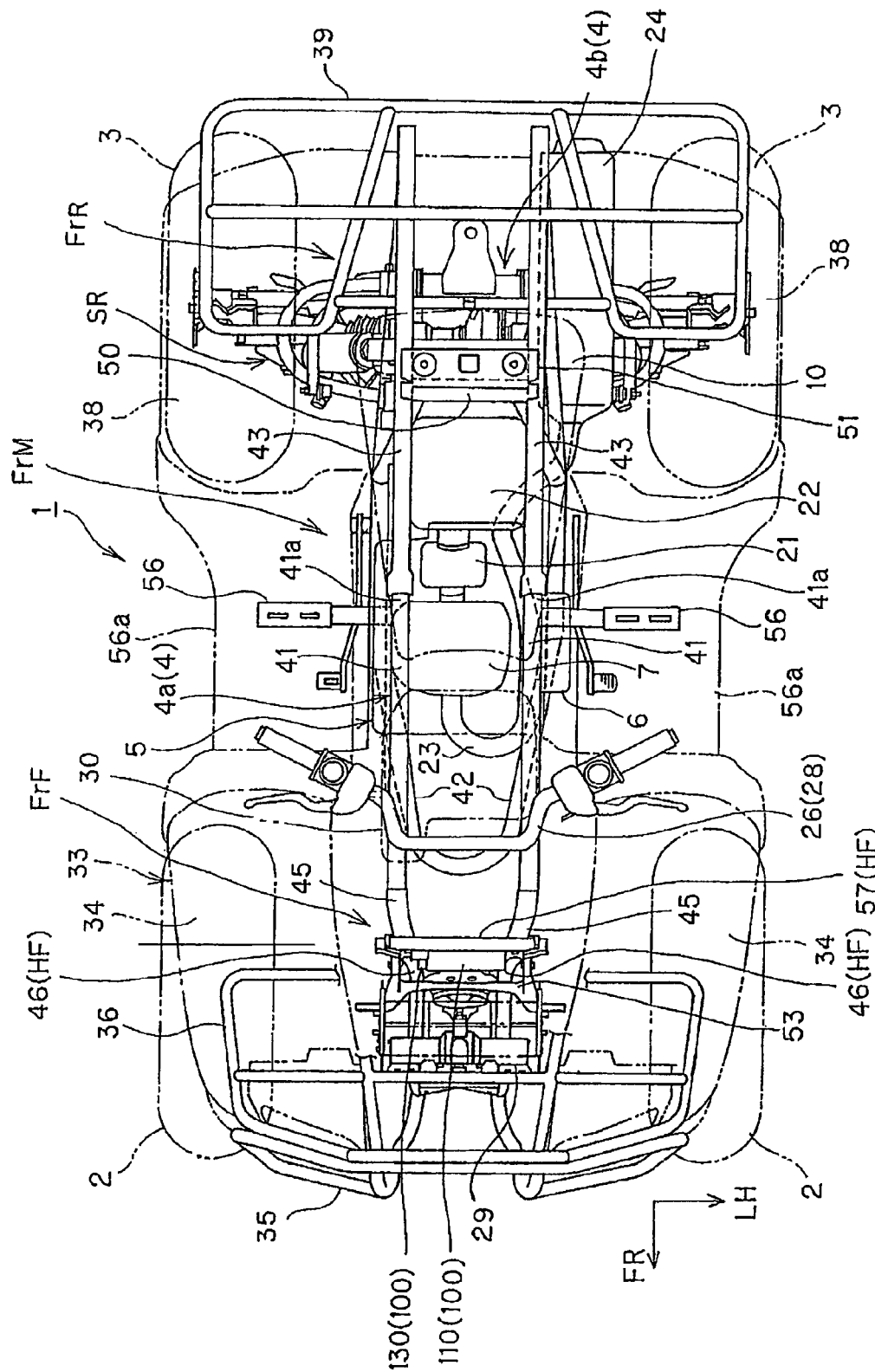
FIG. 2 is a top plan view of the saddle type vehicle.

FIG. 1 is a side elevational view of a saddle type vehicle in which an evaporated fuel controlling apparatus according to a first embodiment of the present invention is incorporated. Meanwhile, FIG. 2 is a top plan view of the saddle type vehicle. The saddle type vehicle 1 includes a pair of left and right front wheels 2 and a pair of rear wheels 3 which are low-pressure balloon tires of a comparatively large diameter formed small and light and provided at front and rear locations of a vehicle body thereof, and is an all terrain vehicle which is called ATV wherein a great minimum road clearance is secured to enhance the drivability principally on irregular ground.

The saddle type vehicle 1 includes a vehicle body frame 4. The vehicle body frame 4 is a frame made of metal wherein metal materials including a plurality of metal pipes are integrally coupled by means of welding or the like, and a pipe frame structure elongated in a forward and backward direction of the vehicle body is formed.

A pair of left and right independent suspension (double wishbone) type front suspensions SF (refer to FIG. 1) are supported at front left and right portions of the vehicle body frame 4, and the left and right front wheels 2 are suspended at a front portion of the vehicle body through the left and right front suspensions SF. A pair of left and right independent suspension (double wishbone) type rear suspensions SR (refer to FIG. 1) are supported also at rear left and right portions of the vehicle body frame 4, and the left and right rear wheels 3 are suspended at a rear portion of the vehicle body through the left and right rear suspensions SR.

An engine 5 as a prime mover is mounted at a central portion of the vehicle body frame 4.

The engine 5 is a water-cooled type single cylinder engine. A cylinder section 7 is erected uprightly substantially vertically on a crankcase 6 which forms a lower portion of the engine 5 and the engine 5 has a so-called vertical installation layout wherein a rotational axial line of a crankshaft supported on the crankcase 6 extends along the forward and backward direction of the vehicle.

The crankcase 6 is used also as a change gear case for accommodating a change gear therein, and propeller shafts 8 and 9 for the front wheels and rear wheels connected to the change gear in the crankcase 6 are led out forwardly and backwardly from the front and rear of the crankcase 6.

The propeller shafts 8 and 9 are connected to front and rear final gear cases 11 and 12 provided on the lower side of a front portion and the lower side of a rear portion of the vehicle body frame 4, respectively, and rotating force of the propeller shafts 8 and 9 is transmitted to drive shafts 13 and 14 extending from the gear cases 11 and 12 in leftward and rightward directions, respectively. In particular, rotating power of the engine 5 is transmitted at a predetermined change gear ratio to the propeller shafts 8 and 9 through the change gear in the crankcase 6 and the speed is decreased to the predetermined change gear ratio by the final gear cases 11 and 12 to drive the drive shafts 13 and 14 to rotate.

The drive shafts 13 and 14 drive the front wheels 2 and the rear wheels 3 to rotate, respectively, and as a result, a vehicle body driving system for driving the front wheels 2 and the rear wheels 3 to rotate by the driving force of the engine 5 is configured. It is to be noted that a driving method changeover mechanism capable of changing over a driving method not only to four-wheel driving for driving all of the front wheels 2 and the rear wheels 3 but also to two-wheel driving for driving one of the front wheels 2 and the rear wheels 3 may be provided.

A throttle body 21 is connected to the rear side of the cylinder section 7 of the engine 5 and an air cleaner case 22 is connected to the rear side of the throttle body 21, and as a result, an intake system of the engine 5 is configured from the throttle body 21 and the air cleaner case 22. Further, an exhaust pipe 23 is connected to the front side of the cylinder section 7 of the engine 5. The exhaust pipe 23 extends forwardly of the cylinder section 7 and is curved toward a left direction and further toward a rearward direction. The exhaust pipe 23 further extends toward a rearward direction of the vehicle body through the left rear side with respect to the cylinder section 7 and is connected to a silencer 24 disposed at a rear portion of the vehicle body. An exhaust system of the engine 5 is configured from the exhaust pipe 23 and the silencer 24.

A steering shaft 25 is supported for rotation at a central portion in a left and right direction of the front portion of the vehicle body frame 4. The steering shaft 25 is disposed in a rearwardly upwardly inclined relationship and a bar type steering handle member 26 is integrally mounted at an upper portion of the steering shaft 25. Further, a steering arm 27 which functions as a steering force transmitting member is connected to the steering shaft 25, and the steering arm 27 is connected to the left and right front wheels 2 through a pair of left and right tie rods (not shown) and the front wheels 2 are steered in accordance with rotation of the steering shaft 25. Consequently, a steering mechanism 28 for steering the left and right front wheels 2 by operation of the steering handle 26 is configured.

A fuel tank 30 is disposed on the rear of the steering shaft 25 of the vehicle body frame 4. The fuel tank 30 is positioned above the engine 5 suspended on the vehicle body frame 4, and a fuel pump 32 for pressure-feeding fuel in the fuel tank 30 to the intake system of the engine 5 is disposed in a space between the fuel tank 30 and the engine 5. The fuel pump 32 pressure-feeds fuel to a fuel supplying apparatus (injector) provided in the throttle body 21 connected to an intake port of the engine 5.

Forwardly of the steering shaft 25 of the vehicle body 4, a radiator 29 for cooling the engine is mounted on the vehicle body frame 4 through a sub frame not shown.

With the configuration, traveling wind from the front of the vehicle body passes to the radiator 29 without being blocked by the steering shaft 25 and so forth and can be applied to the radiator 29 efficiently. More particularly, the radiator 29 is disposed rearward of the front end of the vehicle body frame 4 (rearward of a front protector 35 hereinafter described) and forwardly with respect to the front suspension SF.

Further, a vehicle body cover 33 made of resin for covering the front portion of the vehicle body including the radiator 29 and the fuel tank 30 from above, a front fender 34 made of resin for covering both of the front wheels 2 from above to the back of the wheels and a front protector 35 and a front carrier 36 for covering a front face and a front upper portion of the vehicle body cover 33, respectively, are mounted on the front portion of the vehicle body frame 4. Further, a skid plate 37 is mounted on the front lower portion of the vehicle body frame 4. Therefore, the parts disposed at the front portion of the vehicle body such as the radiator 29, steering shaft 25 and so forth are surrounded by the vehicle body frame 4, vehicle body cover 33, front fender 34, front protector 35, front carrier 36 and skid plate 37.

Further, a rear fender 38 made of resin for covering both of the rear wheels 3 from the front to above the wheels 3 and a rear carrier 39 formed principally from a steel material are mounted at the rear portion of the vehicle body frame 4.

Figure 3:
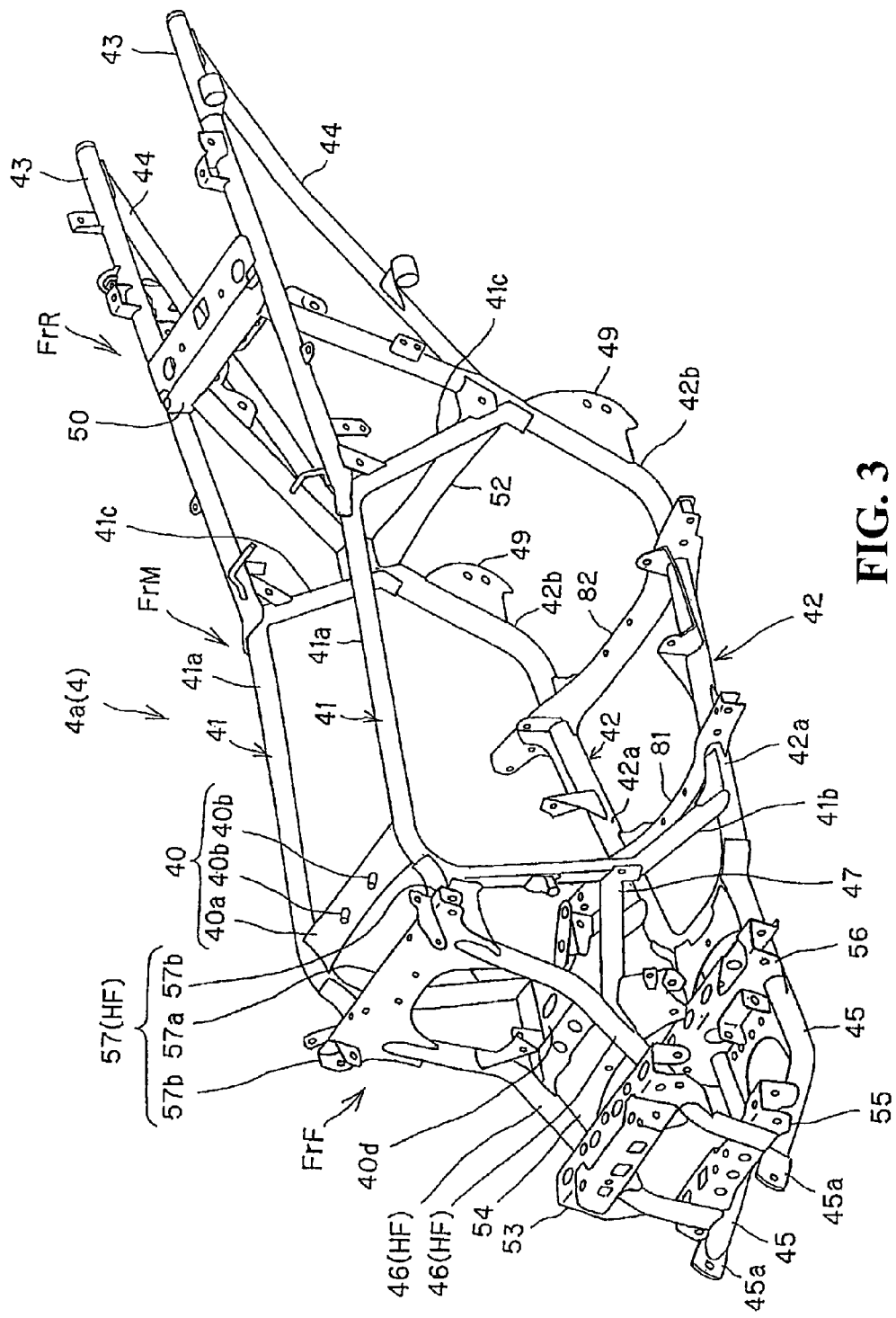
FIG. 3 is a view showing a frame body of a vehicle body frame.

Now, a general structure of the vehicle body frame 4 is described. FIG. 3 shows a frame main body 4a of the vehicle body frame 4. The vehicle body frame 4 includes the frame main body 4a having a pipe frame structure extending in the forward and backward direction of the vehicle body and a sub frame 4b connected to a rear portion of the frame main body 4a (refer to FIG. 1).

The frame main body 4a forms a pair of closed loop structures mainly including a pair of left and right upper pipes 41 and a pair of lower pipes 42 and forms a frame elongated forwardly and backwardly.

An upper steering supporting portion 40 for supporting the steering shaft 25 is stretched between front portions of the left and right upper pipes 41. The upper steering supporting portion 40 functions also as a cross member for connecting the upper pipes 41 to each other to enhance the frame strength, and includes a cross member 40a stretched between the upper pipes 41 and left and right boss portions 40b mounted on the cross member 40a and projecting forwardly. And, a bearing 40c (refer to FIG. 1) is supported on the left and right boss portions 40b through a bolt (not shown), and the steering shaft 25 is supported for rotation on the bearing 40c.

Further, also a lower steering supporting portion 40d (refer to FIG. 3) for supporting a lower end portion of the steering shaft 25 is provided on the frame main body 4a. The lower steering supporting portion 40d is provided between front sub pipes 47 hereinafter described, and supports a lower portion of the steering shaft 25 for rotation.

Each of the upper pipes 41 includes a backwardly extending pipe section 41a extending from the upper steering supporting portion 40 to the rear of the vehicle, a front side down pipe section 41b connecting to a front end portion of the backwardly extending pipe section 41a and extending downwardly toward the rear side of the vehicle (downwardly backwards) from the upper steering supporting portion 40 and a rear side down pipe section 41c extending downwardly toward the rear side of the vehicle from a rear end portion of the backwardly extending pipe section 41a, and is formed by bending one steel pipe.

Each of the lower pipes 42 includes a forwardly and backwardly extending frame section 42a connected to the lower end of the front side down pipe section 41b of the upper pipe 41 and extending substantially horizontally in the forward and backward direction of the vehicle and a rear inclination frame portion 42b which extends upwardly toward the rear side of the vehicle (upwardly backwards) from a rear end portion of the forwardly and backwardly extending frame section 42a. A lower end of the rear side down pipe section 41c of the upper pipe 41 is connected to an intermediate portion in the upward and downward direction of the rear inclination frame portion 42b, and also the lower pipe 42 is formed by curving one steel pipe.

Further, as shown in FIG. 2, the front end portions of the left and right lower pipes 42 (front end portions of the forwardly and backwardly extending frame portions 42a) are connected to each other so as to have a convex arc shape in the forward direction as viewed in top plan, and cross members 81 and 82 for connecting the lower pipes 42 to each other are provided in a spaced relationship from each other rearward of the front end portions and the connecting strength of the left and right lower pipes 42 is enhanced.

Further, step bars 56 are provided on the left and right forwardly and backwardly extending frame portions 42a, and rider's steps are configured from the step bars 56 and step boards 56a (refer to FIG. 2) disposed below the step bars 56. The engine 5 is supported through a plurality of engine mounts (not shown) in a region surrounded by the upper pipes 41, lower pipes 42 and cross members 81 and 82.

Here, description is given taking a frame portion of the vehicle body frame 4 for supporting the engine 5 as a vehicle body intermediate frame FrM, taking a front side portion of the vehicle body frame 4 with respect to the vehicle body intermediate frame FrM as a vehicle body front frame FrF, and taking a rear side portion of the vehicle body frame 4 with respect to the vehicle body intermediate frame FrM as a vehicle body rear frame FrR. Since the vehicle body intermediate frame FrM is configured as a frame for surrounding the engine 5 and the members around the engine 5 (parts of the intake and exhaust systems for the engine 5 and so forth) from the upper pipes 41, lower pipes 42 and cross members 81 and 82, the frame rigidity can be secured sufficiently and the influence of disturbance such as mud, water and so forth on the members disposed intermediately of the vehicle body such as the engine 5 can be avoided sufficiently.

Now, a structure of the rear portion of the vehicle body frame 4 (structure of the vehicle body rear frame FrR) is described.

Front end portions of a pair of left and right rear upper pipes 43 used also as seat rails are connected to the rear end portions of the backwardly extending pipe sections 41a of the left and right upper pipes 41. The rear upper pipes 43 extend in a substantially horizontal direction toward the rear of the vehicle body and a cross member 50 is provided between intermediate portions in a frontward and backward direction of the pipes 43, and rear ends of the rear inclination frame portions 42b of the lower pipes 42 are connected to the cross member 50.

Further, a seat supporting section for supporting the seat 10 in a state wherein it is provided between the pair of left and right rear upper pipes 43 is mounted on the cross member 50.

A rear sub pipe 44 is disposed between an upwardly and downwardly intermediate portion of the rear inclination frame portion 42b of each of the lower pipes 42 and a rear end portion of each of the rear upper pipes 43, and a cross member 52 is provided at left and right connection portions at which the rear inclination frame portions 42b, rear upper pipes 43 and rear sub pipes 44 are connected to each other. The rigidity of the rear portion of the frame main body 4a is enhanced.

Brackets 48 and 49 are provided in an upwardly and downwardly spaced relationship between the rear portion inclination frame portions 42b of the frame main body 4a, and the sub frame 4b (refer to FIG. 1) is supported through the brackets 48 and 49.

The sub frame 4b is formed as a metal frame wherein metal materials including a plurality of pipes made of metal are connected integrally by welding or the like.

The sub frame 4b includes a pair of left and right sub lower pipes 61 connected to the bracket 49 and extending rearward of the vehicle body, a pair of left and right sub upper pipes 62 extending rearward of the upper side of the vehicle from front end portions of the sub lower pipes 61, a pair of left and right extension pipes 63 for connecting the sub upper pipes 62 and the brackets 49, and a rear member 64 for connecting end portions of the sub upper pipes 62 and the sub lower pipes 61 to each other. The frame rigidity is enhanced by the components 61 to 64.

In a region surrounded by the sub frame 4b, the final gear case 12 is supported and a brake caliper 17b for pressing a pad against a brake disk 17a fixed coaxially on the propeller shaft 9 for the rear wheels 3 is supported on the front side of the final gear case 12. With the configuration just described, the final gear case 12, propeller shaft 9 for the rear wheels 3 and brake parts are surrounded by the sub frame 4b, and the influence of disturbance can be avoided.

Further, cross members 66 and 70 are provided in an upwardly and downwardly spaced relationship between the extension pipes 63, and upper ends of the pair of left and right rear suspensions SR are supported on the lower side cross member 70.

In particular, the vehicle body rear frame FrR which configures the rear portion of the vehicle body frame 4 is configured from the rear portion of the frame main body 4a and the sub frame 4b, and the sub frame 4b is supported on the rear lower portion of the frame main body 4a and is configured as a framework for surrounding the final gear case 12, rear brake parts and propeller shaft 9. Consequently, the frame rigidity of the vehicle body rear frame FrR can be sufficiently secured and the influence of disturbance on the parts disposed at the rear portion of the vehicle body can be avoided sufficiently.

Now, the front structure of the vehicle body frame 4 (structure of the vehicle body front frame FrF) is described.

A pair of left and right front lower pipes 45 are connected to front portions of the left and right lower pipes 42. The left and right front lower pipes 45 extend forwardly of the vehicle in a substantially horizontal direction from the forwardly and backwardly extending frame portions 42a of the lower pipes 42, and front protectors 35 (refer to FIGS. 1 and 2) are connected to front end portions 45a. The front protector 35 functions also as carry pipes for supporting the front carrier 36.

A pair of left and right front cushion pipes (down pipes) 46 are connected in the proximity of the front end portions 45a of the front lower pipes 45. The left and right front cushion pipes 46 extend upwardly toward the rear side of the vehicle in an S-shape curved state as viewed in side elevation from the front lower pipes 45, and upper end portions of the pipes 46 are connected to front end portions of the upper pipes 41. Further, a pair of left and right front sub pipes 47 inclined a little forwardly upwards are stretched between the front cushion pipes 46 and the front side down pipe sections 41b of the upper pipes 41.

In particular, the front lower pipes 45, front cushion pipes 46, upper pipes 41 (front side down pipe sections 41b) and front sub pipes 47 configure principal parts of the vehicle body front frame FrF, and the framework is formed from the principal parts.

Therefore, the frame rigidity of the vehicle body front frame FrF can be secured sufficiently, and since the steering mechanism 28 including the steering shaft 25, final gear case 11 and drive shaft 13 are disposed in the framework, the influence of disturbance on the parts can be avoided.

Further, a pair of front and rear cross members 53, 54, 55 and 56 are provided in an upwardly and downwardly spaced relationship frame each other on the framework.

The cross members 53 to 56 individually have a substantially rectangular shape in cross section which is opened downwardly and support a pair of left and right upper arms (not shown) and a pair of lower arms (not shown) for the left and right front wheels 2 for rocking motion. In particular, base end portions of the pair of left and right upper arms (not shown) are supported for upwardly and downwardly rocking motion at both side portions of the pair of upper side front and rear cross members 53 and 54, and base end portions of the pair of left and right lower arms (not shown) are supported for upwardly and downwardly rocking motion at both side portions of the pair of lower side front and rear cross members 55 and 56. It is to be noted that the cross members 53 to 56 are provided at a position lower than the front sub pipe 47, and the frame rigidity of the front lower pipes 45, front cushion pipes 46 and front sub pipes 47 is enhanced.

Further, a cross member 57 for supporting the upper ends of the left and right front suspensions SF is provided between upper portions of the left and right front cushion pipes 46.

The cross member 57 integrally includes a cross member 57a stretched between the upper portions of the front cushion pipes 46 and a pair of left and right cushion supporting sections 57b provided on the left and right of the cross member and projecting sidewardly farther than the front cushion pipes 46.

The cross member 57 has a substantially rectangular shape in cross section which is open downwardly, and is formed as a cross member wide in an upward and downward direction in comparison with that at least in a case wherein the cross member is formed from a metal pipe. By forming the cross member 57 so as to have a substantially rectangular shape in cross section which is opened downwardly opened in this manner, the upper ends of the left and right front suspensions SF can be inserted from the lower side and supported easily for rotation through supporting pins (not shown).

In the present configuration, the cross members 53 to 57 are provided on the vehicle body front frame FrF, and, by the cross members 53 to 57, the frame rigidity is further enhanced and the influence of disturbance on the parts disposed on the vehicle body front frame FrF can be avoided still more.

Further, the vehicle body cover 33 and the front protector 35 are disposed at the front portion of the vehicle body front frame FrF, and the vehicle body cover 33 and the front carrier 36 are disposed at the upper portion of the vehicle body front frame FrF and the skid plate 37 is further disposed at the lower portion of the vehicle body front frame FrF (refer to FIG. 1). Therefore, the influence of disturbance on the members disposed on the vehicle body front frame FrF can be avoided sufficiently also by the configuration described above.

In the present configuration, since the radiator 29 for cooling the engine is disposed at the upper portion of the cross member 53 as shown in FIG. 1, the radiator 29 can be surrounded by the vehicle body cover 33, front protector 35, front carrier 36 and so forth and the influence of disturbance on the radiator 29 is suppressed. Since a radiator grille is provided on the front face of the radiator 29, the influence on the radiator 29 itself is avoided sufficiently by the grille.

Now, an evaporated fuel controlling apparatus 100 is described.

The saddle type vehicle 1 of the present embodiment includes the evaporated fuel controlling apparatus 100 for preventing emission of evaporated fuel generated by the fuel tank 30 into the atmosphere.

Figure 4:
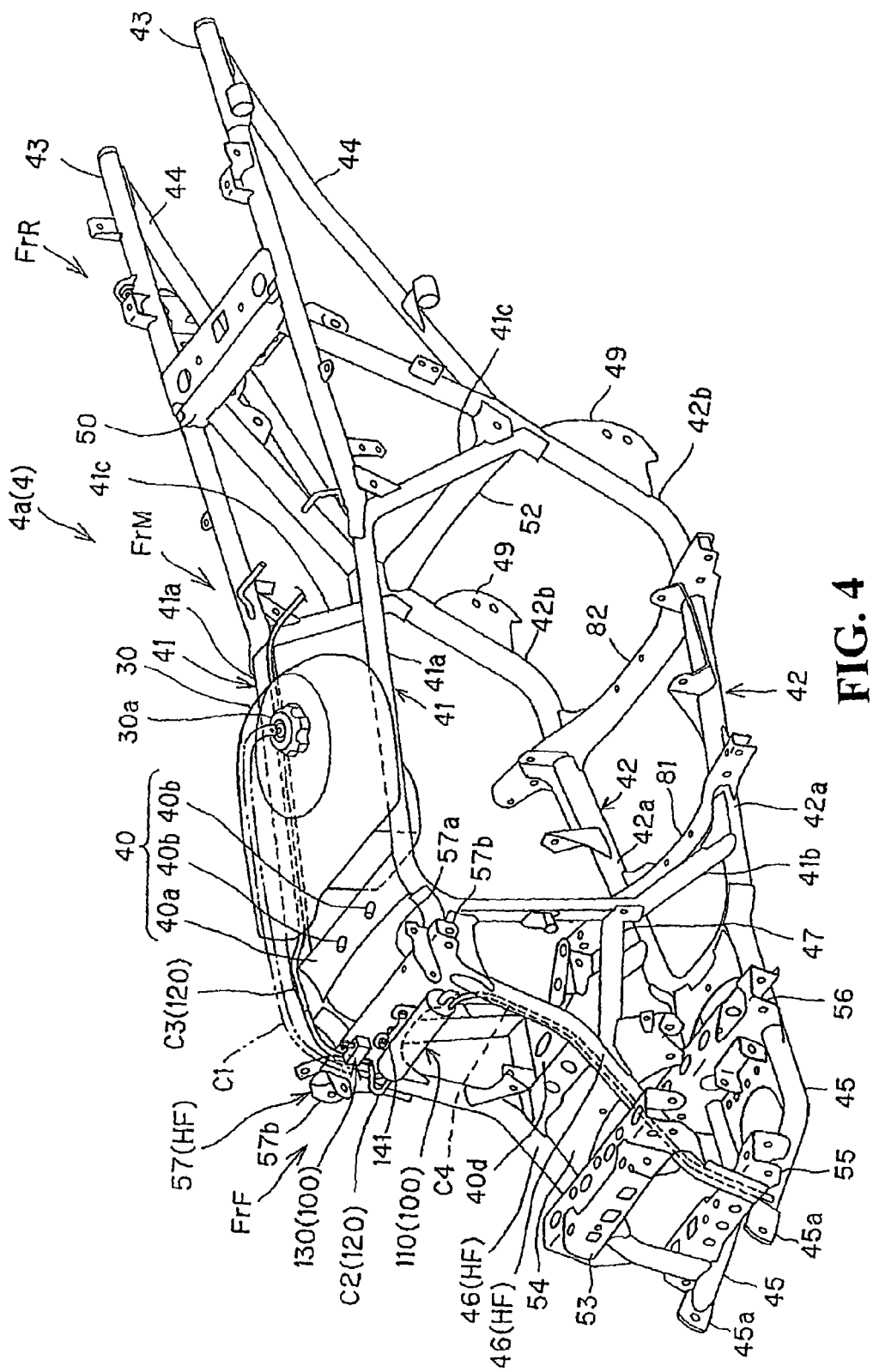
FIG. 4 is a view showing a disposition structure of the evaporated fuel controlling apparatus.
Figure 5:
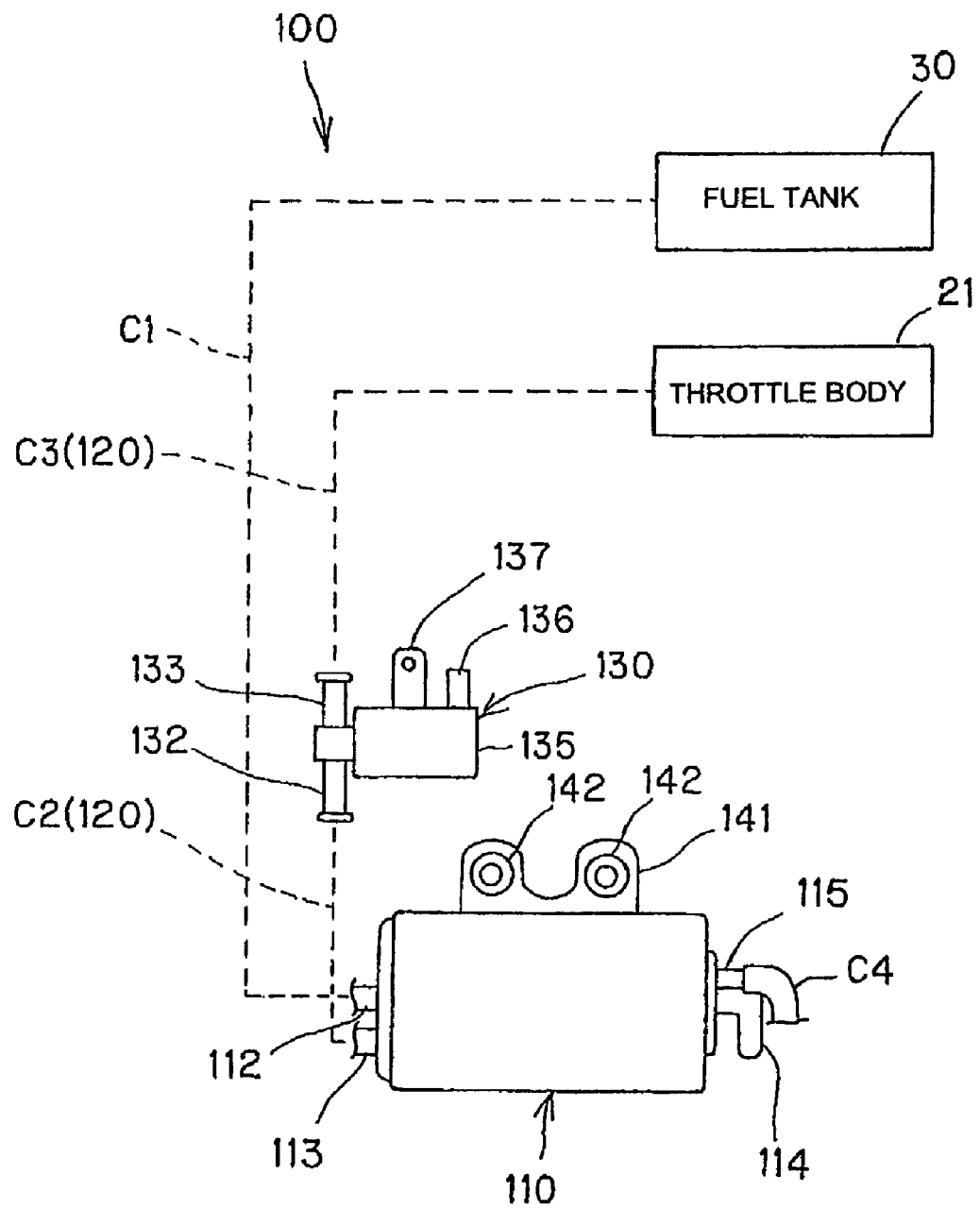
FIG. 5 is a view showing a connection structure of the evaporated fuel controlling apparatus.

FIG. 4 is a view showing a disposition structure of the evaporated fuel controlling apparatus 100, and FIG. 5 is a view showing a connection structure of the evaporated fuel controlling apparatus 100.

The evaporated fuel controlling apparatus 100 includes a canister 110 for absorbing evaporated fuel generated from the fuel tank 30, a purge path 120 for connecting the canister 110 and the intake system of the engine 5 to each other, and a purge controlling section 130 for controlling the flow rate of evaporated fuel to be supplied from the canister 110 to the intake system of the engine 5 through the purge path 120 (refer to FIGS. 4 and 5).

The canister 110 is formed in a cylindrical shape wherein absorbent such as activated carbon or the like is accommodated in the inside thereof. As shown in FIG. 5, a charging opening 112 for taking in evaporated fuel generated from the fuel tank 30 and a purge opening 113 for returning evaporated fuel accumulated in the canister 110 to the intake side of the engine 5 are provided at one end side of the canister 110, and an atmosphere opening 114 for taking in the atmosphere of the outside and a drain opening 115 for draining water and fuel in the form of liquid in the canister 110 are provided at the other end side of the canister 110.

In the canister 110, the charging opening 112, purge opening 113 and drain opening 115 are formed from tube connecting portions to which tubes C1, C2 and C3 having air-tightness (impermeability of evaporated fuel) can be connected at one end thereof. Further, the atmosphere opening 114 is formed in the form of a bent pipe bent in a substantially L shape such that a tip end thereof is directed downwardly in a state wherein the canister 110 is mounted.

The purge controlling section 130 includes an entrance opening 132 into which evaporated fuel from the canister 110 is admitted, an exit opening 133 for sending evaporated fuel to the intake system of the engine 5, and a main body section 135 for driving a solenoid valve provided on an internal path for communicating the entrance opening 132 and the exit opening 133 with each other.

Also the entrance opening 132 and the exit opening 133 are formed as tube connecting portions to which the other ends of the tubes individually having air-tightness can be connected. Further, a connector 136 to which wiring lines extending from a controlling apparatus (not shown) for controlling the saddle type vehicle 1 are connected is provided on the main body section 135 of the purge controlling section 130 and is configured so as to drive the solenoid valve under the control of the controlling apparatus.

In the present embodiment, the canister 110 and the purge controlling section 130 are mounted on the cross member 57 of the vehicle body front frame FrF (refer to FIG. 4).

A bracket 141 in the form of a plate is provided on the canister 110, and the canister 110 is fixed with a bolt to the front face of the cross member 53 through the bracket 141 (refer to FIG. 4). As shown in FIG. 5, hole portions are formed in a leftwardly and rightwardly spaced relationship on the bracket 141, and strut mounts 142 are mounted individually in the hole portions. The bracket 141 is pressed against the front face of the cross member 57a of the cross member 57 through the strut mounts 142 and is fastened to the cross member 57a by a pair of left and right bolts thereby to secure the canister 110 to the cross member 53.

Consequently, since the canister 110 is supported on the vehicle body front frame FrF through the strut mounts 142, vibration to be transmitted from the vehicle side to the canister 110 can be reduced.

Further, the canister 110 is disposed in a lateral direction such that an axial line thereof extends along a widthwise direction of the vehicle and is disposed within the width of the left and right front cushion pipes 46. In the lateral disposition, one end side of the canister 110 having the charging opening 112 and the purge opening 113 is directed toward one side (in the present embodiment, toward the right side) of the left and right sides of the vehicle, and the other end side is directed toward the other side (in the present embodiment, toward the left side) of the left and right sides of the vehicle.

The purge controlling section 130 is mounted above the canister 110 in the cross member 57 (refer to FIG. 4).

As shown in FIG. 5, a bracket 137 extending from the main body section 135 is provided on the purge controlling section 130, and, by fixing the bracket 137 to the cross member 57 with a bolt, the purge controlling section 130 is mounted on the cross member 57.

In this instance, the purge controlling section 130 is mounted on the cross member 57a of the cross member 57 and is disposed within the width of the left and right front cushion pipes 46. Further, the purge controlling section 130 is disposed in a displaced relationship to one of the left and right of the vehicle 1 so that the entrance opening 132 which is the connection side to the canister 110 comes close to the purge opening 113 of the canister 110. In the present embodiment, since the purge opening 113 is positioned on the right side of the vehicle as shown in FIG. 4, also the purge controlling section 130 is disposed in a displaced relationship to the right side of the vehicle. Therefore, the entrance opening 132 of the purge controlling section 130 is disposed so as to be directed to the lower side of the vehicle which is the canister 110 side, and the exit opening 133 of the purge controlling section 130 is disposed so as to be directed toward the upper side of the vehicle.

An outline of the tube connection of the evaporated fuel controlling apparatus 100 is described. As shown in FIG. 5, an end of the tube C1 is connected to the charging opening 112 of the canister 110 and the other end of the tube C1 is connected to the fuel tank 30. Further, an end of the tube C2 is connected to the purge opening 113 of the canister 110 and the other end of the tube C2 is connected to the entrance opening 132 of the purge controlling section 130. Further, an end of the tube C3 is connected to the exit opening 133 of the purge controlling section 130 and the other end of the tube C3 is connected to the throttle body 21 which is the intake system of the engine 5.

In particular, the tube C1 forms a path for supplying evaporated fuel generated from the fuel tank 30 to the canister and the tubes C2 and C3 form the purge path 120 for connecting the canister 110 and the throttle body 21 to each other.

Further, an end of the tube C4 is connected to the drain opening 115 of the canister 110 and the other end of the tube C4 is disposed at a predetermined location suitable for drain discharge of the canister 110.

Particular disposition of the tubes C1 to C4 is described with reference to FIG. 4. For the convenience of description, the tube C1, tube C2, tube C3 and tube C4 are hereinafter referred to as first tube C1, second tube C2, third tube C3 and drain tube C4, respectively.

The first tube C1 is led out toward the rear of the vehicle body substantially along the front face of the cross member 57 from the charging opening 112 of the canister 110 and is connected to a pipe portion provided on a tank cap 30a through a space formed between the fuel tank 30 and the vehicle body cover 33. The pipe portion is a pipe penetrating the tank cap 30a in an upward and downward direction and supplies evaporated fuel generated from the tank cap 30a to the first tube C1. Here, where the evaporated fuel is generated, since the internal pressure of the fuel tank 30 becomes higher than the atmospheric pressure, the evaporated fuel is supplied to the first tube C1 by the difference in pressure and is introduced into the canister 110.

In the configuration, since the canister 110 is disposed in the proximity of the fuel tank 30 above the engine 5, the first tube C1 can be short and evaporated fuel can be introduced efficiently into the canister 110. Further, since the canister 110 and the first tube C1 do not project in a lateral direction of the vehicle body frame 4, the influence of disturbance on the members just described can be avoided sufficiently.

The second tube C2 is connected so that the purge opening 113 of the canister 110 and the entrance opening 132 of the purge controlling section 130 disposed in the proximity of the purge opening 113 are connected to each other. In this instance, the second tube C2 is formed from a very short tube, and the second tube C2 is laid substantially along the front face of the cross member 57 so as not to project in a lateral direction so that the influence of disturbance can be avoided.

The third tube C3 is led out rearward of the vehicle body substantially along the front face of the cross member 57 from the exit opening 133 of the purge controlling section 130. Further, the third tube C3 is led out rearwardly of the vehicle body along the inner side of the upper pipe 41 (rearwardly extending pipe section 41a). Then, the third tube C3 is connected to the throttle body 21 in a spaced relationship from the lower pipe 42 in the proximity of the throttle body 21.

Consequently, where the purge controlling section 130 places the solenoid valve in the inside into an open state, both of the purge opening 113 of the canister 110 and the intake path of the throttle body 21 are communicated with each other. Therefore, if a pressure difference appears between the intake path and the canister 110, that is, if the engine 5 is being driven, then evaporated fuel in the canister 110 is sucked out and introduced into the intake path so as to be utilized for driving of the engine 5. It is to be noted that, as a controlling method for the purge controlling section 130, a publicly known controlling method may be applied widely.

In this instance, since the third tube C3 is disposed along the inner side of the upper pipe 41 (rearwardly extending pipe section 41a) extending in a frontward and backward direction on the upper side of the vehicle body frame 4, the third tube C3 can be disposed utilizing a blank space around the upper pipe 41 and the influence of disturbance can be avoided. Besides, since, in the tube disposition, the third tube C3 extends straightly toward the rear of the vehicle body and is connected to the throttle body 21 through the substantially shortest route, increase of the path resistance can be suppressed.

The drain tube C4 is led out from the drain opening 115 of the canister 110 and further led out downwardly of the vehicle along the inner side of the front cushion pipe 46 extending in the upward and downward direction in the proximity of the drain opening 115, and a lower end of the drain tube C4 is opened above the skid plate 37 (refer to FIG. 1). Therefore, the drain tube C4 does not project to the outer side of the vehicle body frame 4, and the influence of disturbance can be avoided. Further, since the drain tube C4 is opened above the skid plate 37, it becomes difficult for mud from below the vehicle or the like to adhere to the drain tube C4.

Here, the atmosphere opening 114 of the canister 110 takes outside air into the canister 110, or exhausts, when evaporated fuel from the fuel tank is introduced into the canister 110, air in the canister 110 in response to the introduction thereby to make intake and exhaust of evaporated fuel smooth. Further, drain (water or fuel in the form of liquid) accumulated in the inside is discharged smoothly from the drain opening 115.

As described above, in the present embodiment, the evaporated fuel controlling apparatus 100 including the canister 110 and the purge controlling section 130 is mounted on the head front side down frame section (down frame section) HF formed from the front cushion pipe 46 extending downwardly of the front side of the vehicle from the steering shaft 25, the cross member 57 and so forth from within the vehicle body front frame FrF for supporting the steering mechanism 28.

In the saddle type vehicle 1, the parts disposed at the center in the leftward and rightward direction of the vehicle body front frame FrF are restricted almost to the steering mechanism 28 and the front wheel driving system members such as the propeller shaft 8, final gear case 11 and so forth. At this time, since the front wheel driving system members are disposed at the lower portion of the vehicle body front frame FrF (refer to FIG. 1), a comparatively sufficient space is provided on the upper side of the vehicle body front frame FrF, that is, around the steering mechanism 28 such as the steering shaft 25 and so forth. On the other hand, since the engine 5 which is a great size part and the intake system and the exhaust system of the engine 5 each formed from a great number of parts are disposed on the vehicle body intermediate frame FrM and the vehicle body rear frame FrR, there is no sufficient space on the vehicle body intermediate frame FrM and the vehicle body rear frame FrR.

In the present embodiment, thanks to the configuration described above, the space around the steering mechanism 28 can be utilized to dispose the evaporated fuel controlling apparatus 100 including the canister 110, purge controlling section 130, tubes C1 to C4 and so forth efficiently. Besides, almost all parts of the evaporated fuel controlling apparatus 100 can be surrounded by protective parts at the front portion of the vehicle body such as the vehicle body front frame FrF, vehicle body cover 33, front protector 35 and front carrier 36, and the influence of disturbance such as mud and water can be avoided without providing a separate part. Accordingly, in the present embodiment, the components mentioned can be disposed efficiently while the influence of disturbance on the evaporated fuel controlling apparatus 100 is avoided.

Besides, since the canister 110 and the purge controlling section 130 are mounted on the cross member 57 which configures a frame member of the head front side down frame section HF, a special purpose mounting member is not required, and the number of parts can be reduced and also the mountability and the degree of freedom in layout of the evaporated fuel controlling apparatus 100 can be enhanced.

Furthermore, since the cross member 57 has high rigidity, the supporting strength for the evaporated fuel controlling apparatus 100 can be assured sufficiently with a simple and easy mounting structure such as bolt fastening.

Particularly, since the cross member 57 is positioned at the forwardmost portion of the upper side of the vehicle body frame 4, the vehicle body frame 4 does not exist forwardly of the cross member 57, and the disposition space for the evaporated fuel controlling apparatus 100 can be assured readily. While, in the present embodiment, the radiator 29 is disposed forwardly of the cross member 57 as shown in FIG. 1, since a free space for allowing traveling wind to pass therethrough to the radiator 29 is assured rearwardly of the radiator 29 without fail, even the configuration wherein the radiator 29 is disposed forwardly of the cross member 57 allows the disposition space for the evaporated fuel controlling apparatus 100 to be assured readily.

Besides, since this cross member 57 serves also as a part for supporting an upper end of the front suspensions SF, such parts as the canister 110 and the purge controlling section 130 can be provided at a high position.

Usually, the depth of water in which the saddle type vehicle 1 can travel is defined from the position of the exit of the silencer 24 or the intake system of the engine 5, and generally the silencer having a higher degree of freedom in layout than the intake system is disposed at a higher position than that of the intake system. As shown in FIG. 1, in the present configuration, since the canister 110, purge controlling section 130 and tubes C1 to C4 are disposed at positions higher than those of the exit of the silencer 24 and the engine intake system, the depth of water in which the saddle type vehicle 1 can travel can be assured sufficiently while the influence of disturbance on the evaporated fuel controlling apparatus 100 is avoided.

Further, in the present configuration, the canister 110 and the purge controlling apparatus 130 from within the evaporated fuel controlling apparatus 100 are disposed at high positions, and as shown in FIG. 1, the canister 110 and the purge controlling section 130 are disposed at positions higher than that of the lower end of the seat 10 which is positioned higher than the exit of the silencer 24. By disposing the canister 110 having the atmosphere opening 114 for the communication between the inside and the outside and the purge controlling section 130 having electric parts at high positions substantially the same as the seated position of the rider, the influence of disturbance such as water or mud upon the evaporated fuel controlling apparatus 100 can be avoided effectively.

Accordingly, the influence of disturbance on the intake system of the engine 5 through the evaporated fuel controlling apparatus 100 can be avoided sufficiently.

Further, in the present configuration, since the purge controlling section 130 is mounted on the cross member 57 at a position higher than the canister 110, evaporated fuel from the canister 110 can be introduced readily into the purge controlling section 130. Therefore, the necessity for other parts for sucking out evaporated fuel from the canister 110 can be eliminated. Further, since the canister 110, purge controlling section 130 and so forth are positioned rearward of the radiator 29, disturbance such as mud or water from forwardly of the vehicle body is intercepted by the grill or the like on the front face of the radiator 29, and the influence of the disturbance on the evaporated fuel controlling apparatus 100 can be avoided efficiently.

Figure 6:
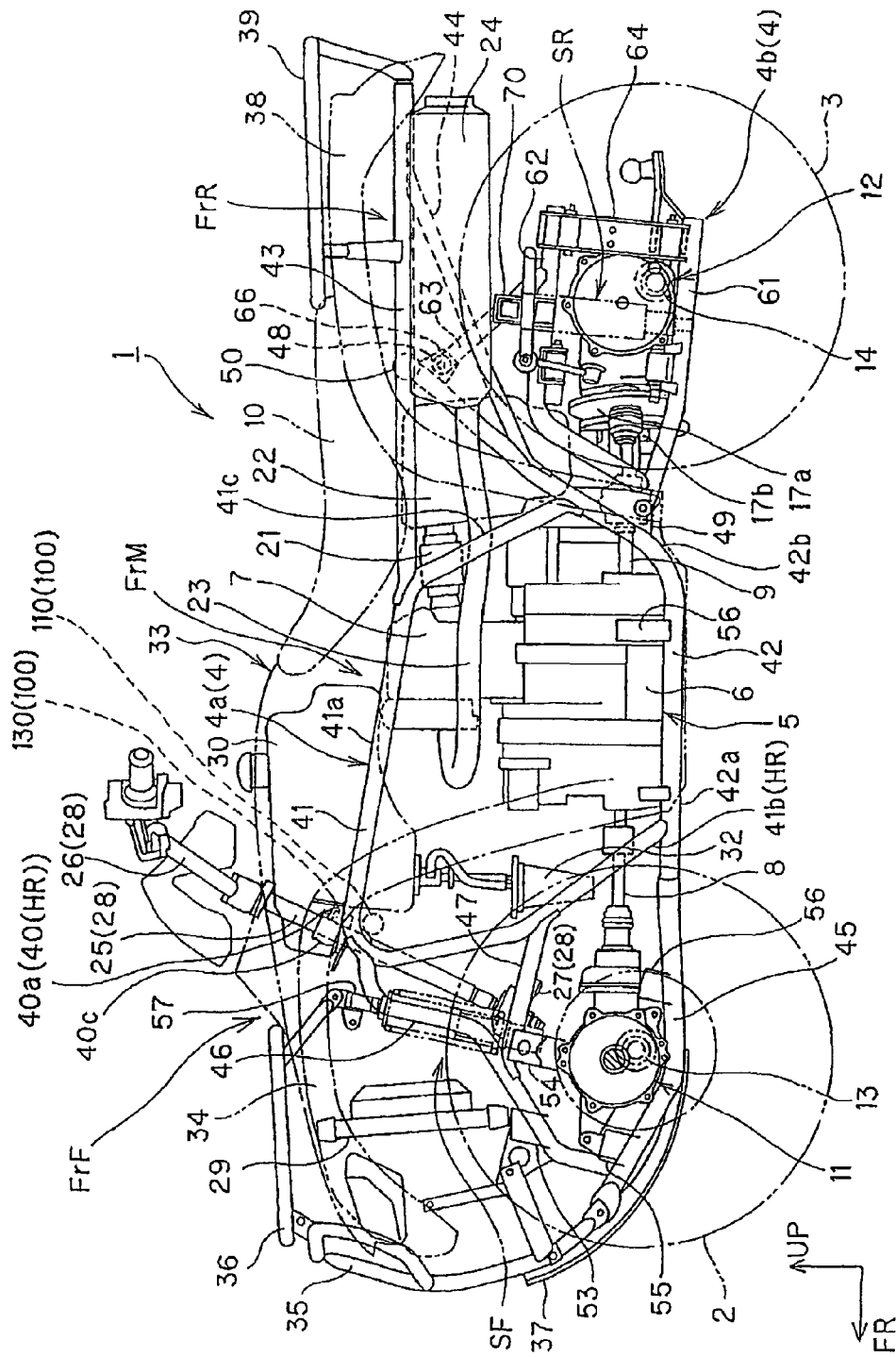
FIG. 6 is a view showing a saddle type vehicle in which an evaporated fuel controlling apparatus according to a second embodiment is incorporated.
Figure 7:
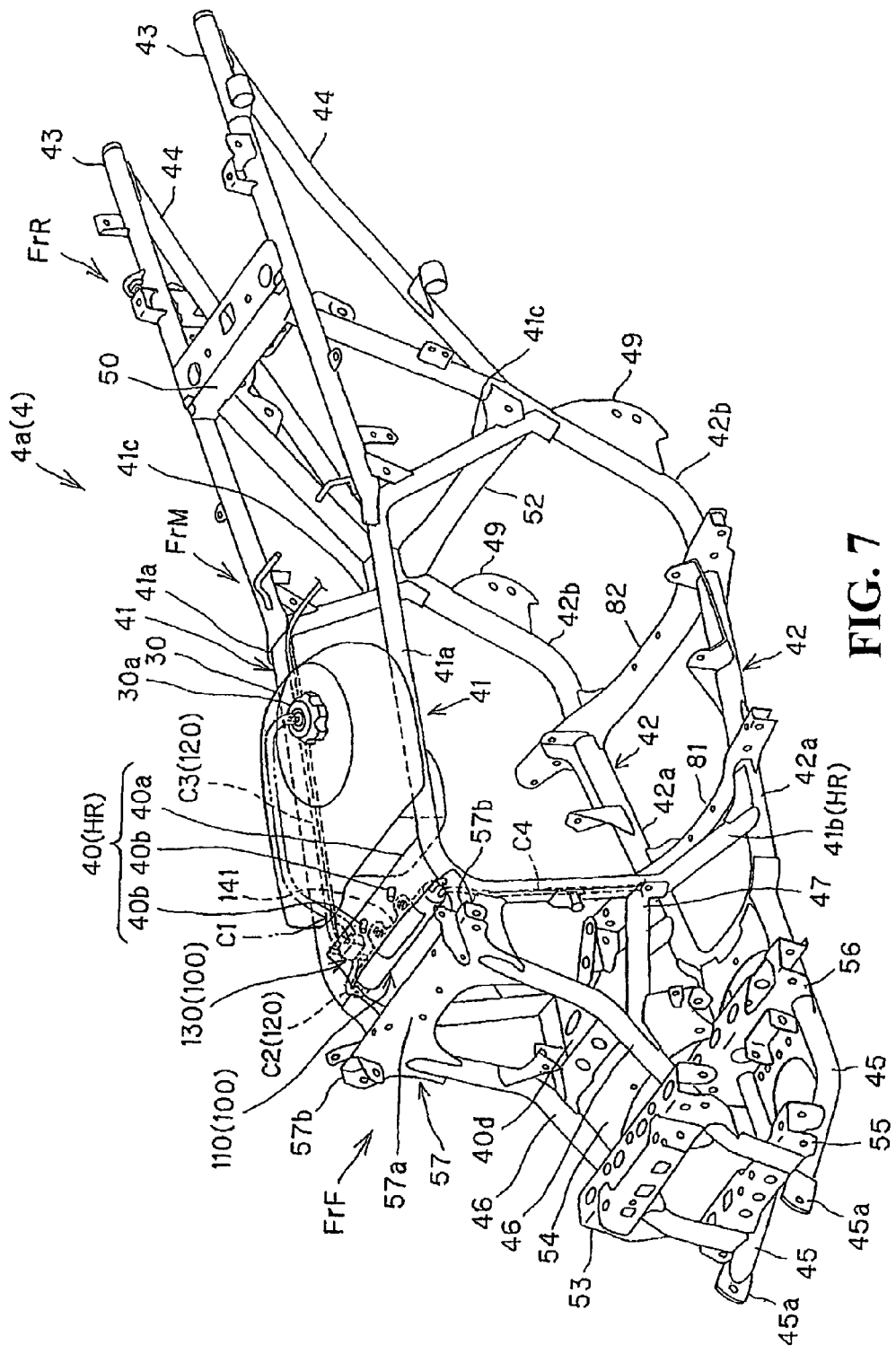
FIG. 7 is a view showing a disposition structure of the evaporated fuel controlling apparatus.

FIG. 6 shows a saddle type vehicle in which an evaporated fuel controlling apparatus according to a second embodiment of the present invention is incorporated, and FIG. 7 shows a disposition structure of the evaporated fuel controlling apparatus 100.

In the present embodiment, the canister 110 and the purge controlling section 130 are mounted on the upper steering supporting portion 40 which supports the steering shaft 25.

In particular, in the saddle type vehicle 1, a space exists between the steering shaft 25 and the fuel tank 30 disposed rearward of the steering shaft 25, and by mounting the canister 110 and the purge controlling section 130 on the rear face of the upper steering supporting portion 40, the evaporated fuel controlling apparatus 100 such as the canister 110, purge controlling section 130, tubes C1 to C4 and so forth can be disposed efficiently utilizing the space rearward of the steering shaft 25 (refer to FIGS. 6 and 7).

More particularly, as shown in FIG. 7, the cross member 40a of the upper steering supporting portion 40 is formed as a plate member which is inclined upward to the rear side (rearwardly upwards) of the vehicle along an inclination angle of the steering shaft 25. The canister 110 is mounted at a central lower portion of the rear face of the cross member 40a through a bracket 141. The purge controlling section 130 is mounted at a position higher than the canister 110 in the proximity of the purge opening 113.

In the present vehicle 1, since the fuel tank 30 is disposed upwardly with respect to the engine 5, the fuel tank 30 is positioned immediately rearward of the steering shaft 25. The space between the fuel tank 30 and the steering shaft 25 is widened downwardly (refer to FIG. 6) since the steering shaft 25 is disposed in an inclined relationship, and the canister 110 can be disposed in the widened space.

Further, since the purge controlling section 130 is smaller than the canister 110, the purge controlling section 130 can be disposed even in a comparatively small space between the upper steering supporting portion 40 and the fuel tank 30.

Further, the first tube C1 extending from the charging opening 112 of the canister 110 is led out upwardly through a gap between the upper steering supporting portion 40 and the fuel tank 30 and is connected to the tank cap 30a through a space formed between the fuel tank 30 and the vehicle body cover 33.

In the present configuration, since the canister 110 is disposed at a position near to the fuel tank 30, the first tube C1 may be formed short and evaporated fuel can be introduced into the canister 110 efficiently. Further, since the canister 110 and the first tube C1 do not project sidewardly of the vehicle body frame 4, the influence of disturbance on them can be avoided sufficiently.

Further, the second tube C2 extending from the purge opening 113 of the canister 110 connects to the entrance opening 132 of the purge controlling section 130 disposed in a downward direction on the rear face of the upper steering supporting portion 40. Therefore, the second tube C2 can be formed from a very short tube and the influence of disturbance can be avoided.

The entrance opening 132 of the purge controlling section 130 is positioned in an upward direction on the rear face of the upper steering supporting portion 40, and the third tube C3 extending from the entrance opening 132 is led out rearwardly of the vehicle along the inner side of the lower pipe 42 and is spaced away from the lower pipe 42 in the proximity of the throttle body 21 until it is connected to the throttle body 21.

The drain tube C4 extending from the drain opening 115 of the canister 110 is led out downwardly of the vehicle along the inner side of the forwardly and backwardly extending frame section 42a of the upper pipe 41 extending upwardly and downwardly in the proximity of the drain tube C4. The drain tube C4 is open at the lower end thereof above the skid plate 37.

As described above, according to the present embodiment, the evaporated fuel controlling apparatus 100 including the canister 110 and the purge controlling section 130 is mounted on a head rear side down frame section (down frame section) HR which includes the front side down pipe section 41b extending downwardly from the steering shaft 25 to the rear side of the vehicle, the upper steering supporting portion 40 and so forth from within the vehicle body front frame FrF which supports the steering mechanism 28 (refer to FIG. 6).

According to the configuration just described, the space around the steering mechanism 28 can be utilized to dispose the evaporated fuel controlling apparatus 100 efficiently while avoiding the influence of disturbance on the evaporated fuel controlling apparatus 100 and also the mountability and the degree of freedom in layout of the evaporated fuel controlling apparatus 100 can be improved. Besides, the influence of disturbance such as mud and water on the evaporated fuel controlling apparatus 100 can be avoided.

Besides, also with the present configuration, the canister 110 and the purge controlling section 130 are disposed at positions higher than the exit of the silencer 24 which is the exit of the exhaust pipe 23 connected to the engine 5 and higher than the lower end of the seat 10 on which the rider is to be seated (refer to FIG. 7). Therefore, with the present embodiment, similar effects to those achieved by the first embodiment can be achieved.

Further, with the present configuration, since the canister 110 and the purge controlling section 130 are mounted on the upper steering supporting portion 40 which is a frame member positioned rearward of the steering shaft 25, a mounting member for exclusive use is not required and the number of parts can be reduced. In this instance, since the canister 110 and the purge controlling section 130 are positioned rearward of the steering shaft 25, the influence of disturbance on the evaporated fuel controlling apparatus 100 can be avoided by members which surround them such as the front of the steering shaft 25.

Besides, since the upper steering supporting portion 40 serves also as a cross member for the vehicle body front frame FrF, it is a part having high rigidity. Consequently, the supporting strength of the evaporated fuel controlling apparatus 100 can be assured sufficiently with a simple mounting structure such as bolt fastening.

Further, since the upper steering supporting portion 40 is a frame member of the vehicle body front frame FrF which is positioned rearward of the steering shaft 25 and in the proximity of the intake system of the engine 5, the canister 110 can be disposed closely to the engine intake system. Therefore, it is possible to form the purge path 120 to be short and feed evaporated fuel efficiently to the intake system.

Furthermore, since the upper steering supporting portion 40 is a frame member between the steering shaft 25 and the fuel tank 30, the canister 110 and the purge controlling section 130 can be surrounded by the steering shaft 25 and the fuel tank 30 to effectively avoid the influence of disturbance on the evaporated fuel controlling apparatus 100.

While the present invention has been described in connection with preferred embodiments thereof, the present invention is not limited to them. For example, while the canister 110 in the embodiments described above is described in a cylindrical shape, it may have any other shape. Also the shape of the purge controlling section 130 may be changed.

Figure 8:
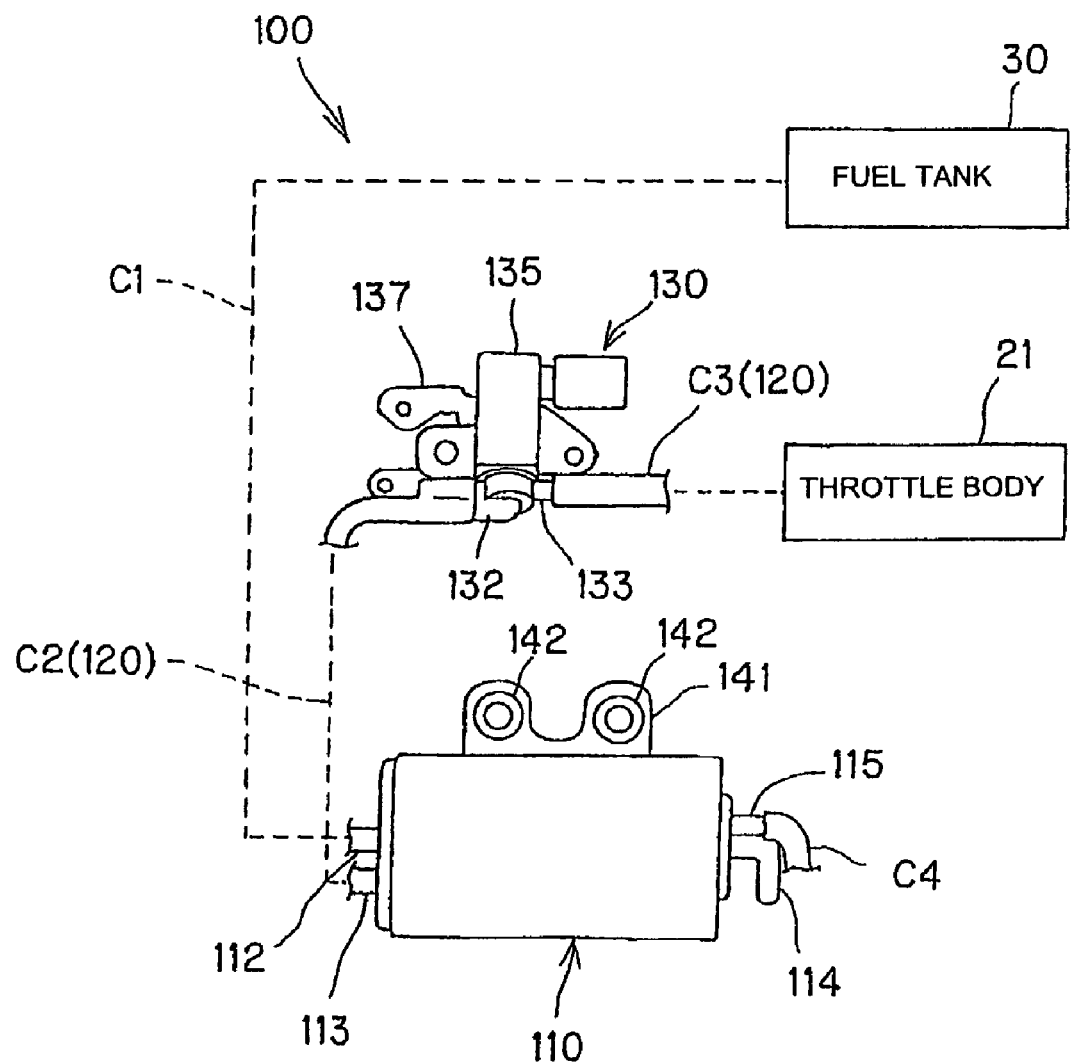
FIG. 8 is a view showing a purge controlling section according to a modification together with peripheral components.

FIG. 8 shows another purge controlling section 130 together with peripheral elements.

In the purge controlling section 130, the entrance opening 132 into which evaluated fuel from the canister 110 is admitted and the exit opening 133 from which evaporated fuel is fed to the intake system of the engine 5 such that the tubes C2 and C3 can be connected to them in horizontal directions along a vehicle widthwise direction. According to the configuration just described, the vertical height of the purge controlling section 130 including the tubes C2 and C3 can be suppressed, and consequently, the disposition on the cross member 57 and the upper steering supporting portion 40 described hereinabove can be facilitated.

Further, while, in the first embodiment described hereinabove, the evaporated fuel controlling apparatus 100 is disposed on the cross member 57 which exists at the uppermost portion of the head front side down frame section HF, the disposition of the evaporated fuel controlling apparatus 100 is not limited to this, but the evaporated fuel controlling apparatus 100 may be disposed on another frame of the head front side down frame section HF. For example, the evaporated fuel controlling apparatus 100 may be disposed on another cross frame on the front side of the vehicle body such as the cross member 53 or may be disposed on the front cushion pipes 46. In this instance, by disposing the evaporated fuel controlling apparatus 100 within the width of the cross frame or on the inner side of the front cushion pipes 46, the influence of disturbance can be avoided effectively.

Further, while, in the second embodiment described hereinabove, the evaporated fuel controlling apparatus 100 is disposed on the cross member 57 positioned at the highest portion of the head rear side down frame section HR, the disposition of the evaporated fuel controlling apparatus 100 is not limited to this, but the evaporated fuel controlling apparatus 100 may be disposed on another frame of the head rear side down frame section HR. For example, the evaporated fuel controlling apparatus 100 may be disposed on some other cross frame of the head rear side down frame section HR or may be disposed on the front side down pipe section 41b. Also in this instance, by disposing the evaporated fuel controlling apparatus 100 within the width of the cross frame or on the inner side of the front cushion pipes 46, the influence of disturbance can be avoided effectively. In a word, the evaporated fuel controlling apparatus 100 should be disposed on the vehicle body front frame FrF within a range within which it can be disposed efficiently while the influence of disturbance on the evaporated fuel controlling apparatus 100 is avoided.

Figure 9:
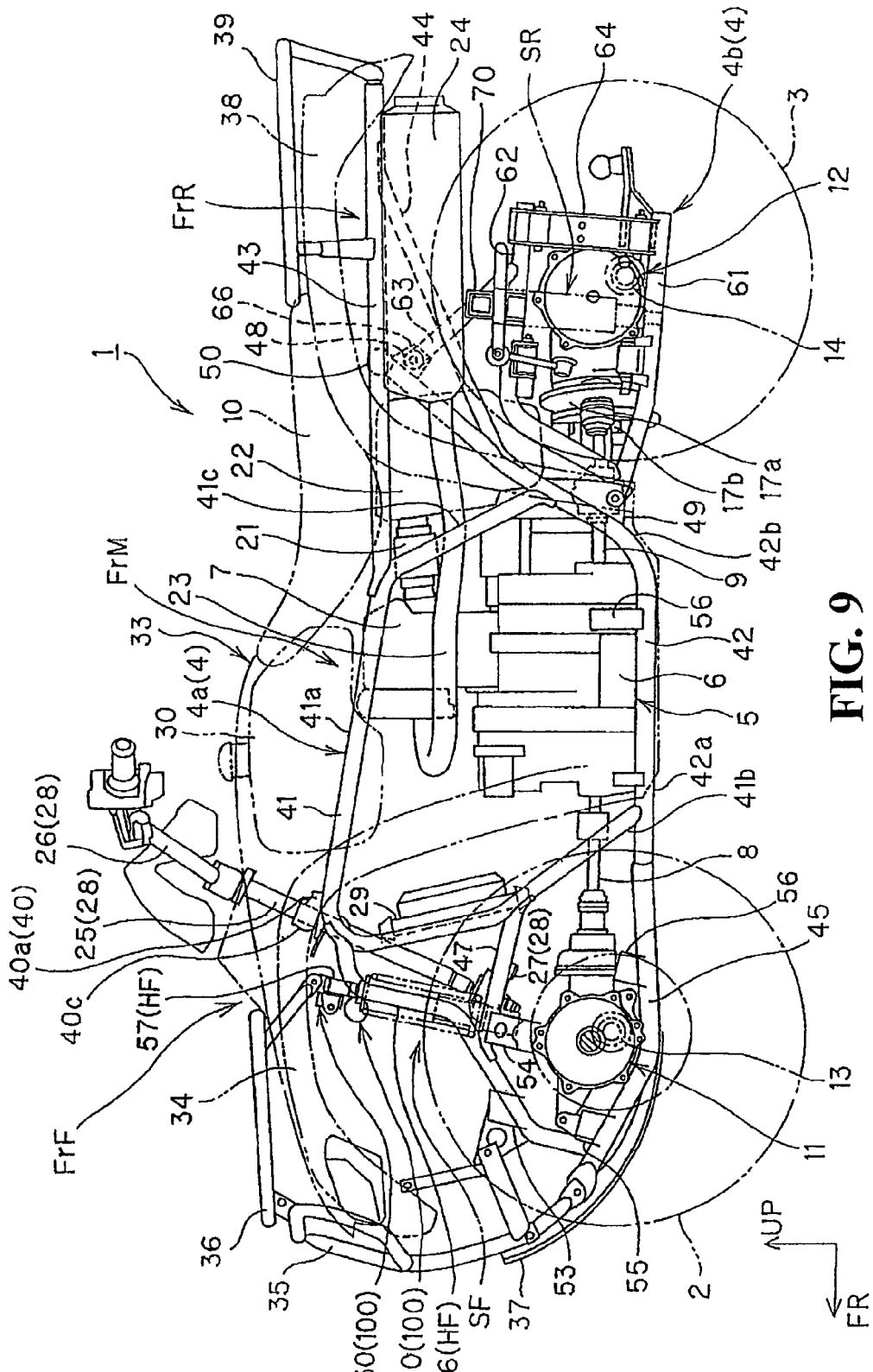
FIG. 9 is a side elevational view showing a saddle type vehicle according to another modification.

Further, in the embodiments described above, the canister 110 and the purge controlling section 130 are disposed on a frame member positioned rearward of the radiator 29. However, the disposition of them is not limited to this, but the canister 110 and the purge controlling section 130 may be disposed on a frame member positioned forwardly with respect to the radiator 29. An example of the configuration just described is shown in FIG. 9.

As shown in this figure, in the present vehicle, the radiator 29 is mounted between a pair of left and right front side down pipe sections 41b extending rearwardly to the rear side of the vehicle body from the upper steering supporting portion 40 by means of stays (not shown). By mounting the canister 110 and the purge controlling section 130 on the cross member 57 which is positioned forwardly with respect to the radiator 29, the influence of disturbance on the evaporated fuel controlling apparatus 100 is avoided by the vehicle body frame FrF.

With the configuration just described, since the radiator 29 is mounted on the front side down pipe sections 41b, each of which is one of main frame members of the vehicle body frame 4, it becomes possible to achieve reduction or simplification (simplification of stays) of a sub frame in comparison with the alternative arrangement described above wherein the radiator 29 is disposed on the front side. In the case of the present configuration, since the radiator 29 is positioned on the rear side with respect to the head front side down frame section HF, a sufficient space is provided forwardly of the radiator 29. Therefore, by mounting the canister 110 and the purge controlling section 130 on the cross member 57 which is one of frame members forwardly of the radiator 29, the space forwardly of the radiator 29 can be utilized to efficiently dispose the evaporated fuel controlling apparatus 100 including the canister 110 and the purge controlling section 130 and improve the mountability. Consequently, it becomes possible to improve the mountability and the degree of freedom in layout of the evaporated fuel controlling apparatus 100.

Further, while in the embodiments described above, the canister 110 and the purge controlling section 130 are mounted on the vehicle body front frame FrF, at least the canister 110 which is a part of the largest size in the evaporated fuel controlling apparatus 100 may be mounted on the vehicle body front frame FrF. Since the other parts of the evaporated fuel controlling apparatus 100 such as the purge controlling section 130 are comparatively small, they may be disposed in a free space in the vehicle body intermediate frame FrM or the vehicle body rear frame FrR.

Further, while in the embodiments described hereinabove, the present invention is applied to a four-wheel saddle type vehicle, the application of the present invention is not limited to this, but the present invention can be applied widely to all terrain vehicles having at least three wheels such as a three-wheel saddle type vehicle.

Although a specific form of embodiment of the instant invention has been described above and illustrated in the accompany drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. An evaporated fuel controlling apparatus for an all terrain vehicle, comprising:
    a canister which absorbs evaporated fuel from a fuel tank;
    a purge path which connects said canister and an intake system of an engine to each other; and
    a purge controlling section which controls a flow rate of the evaporated fuel from said canister to the intake system of the engine through said purge path,
    wherein the all terrain vehicle includes a steering mechanism having a handlebar and a steering shaft supported on a vehicle body front frame at a front portion of the vehicle body,
    wherein at least said canister is mounted on the vehicle body front frame,
    wherein the vehicle body front frame includes a steering supporting portion which supports the steering shaft and a down frame section extending downwardly toward a rear side of the all terrain vehicle from the steering supporting portion,
    wherein at least said canister is mounted on the down frame section,
    wherein the down frame section includes a pair of left and right down pipes and a cross member connecting the down pipes to each other, and
    wherein at least said canister is mounted on the cross member.

2. The evaporated fuel controlling apparatus for the all terrain vehicle according to claim 1, wherein said purge controlling section is mounted on the vehicle body front frame at a location higher than said canister.

3. The evaporated fuel controlling apparatus for the all terrain vehicle according to claim 1,
    wherein a radiator is disposed on the vehicle body front frame, and
    wherein at least said canister is mounted on a frame member positioned rearward of the radiator.

4. The evaporated fuel controlling apparatus for the all terrain vehicle according to claim 1, wherein at least said canister is disposed at a position higher than a lower end of a seat on which a rider is to be seated.

5. The evaporated fuel controlling apparatus for the all terrain vehicle according to claim 1, wherein said canister, said purge path, and said purge controlling section are disposed at a higher position than either an exit of an exhaust pipe connected to the engine or the intake system of the engine.

6. An evaporated fuel controlling apparatus for an all terrain vehicle, comprising:
    a canister which absorbs evaporated fuel from a fuel tank;
    a purge path which connects said canister and an intake system of an engine to each other; and
    a purge controlling section which controls a flow rate of the evaporated fuel from said canister to the intake system of the engine through said purge path,
    wherein the all terrain vehicle includes a steering mechanism having a handlebar and a steering shaft supported on a vehicle body front frame at a front portion of the vehicle body,
    wherein at least said canister is mounted on the vehicle body front frame,
    wherein the vehicle body front frame includes a steering supporting portion which supports the steering shaft and a down frame section extending downwardly toward a front side of the all terrain vehicle from the steering supporting portion, and
    wherein at least said canister is mounted on the down frame section.

7. The evaporated fuel controlling apparatus for the all terrain vehicle according to claim 6,
    wherein the down frame section includes a pair of left and right down pipes and a cross member connecting the down pipes to each other, and
    wherein at least said canister is mounted on the cross member.

8. An evaporated fuel controlling apparatus for an all terrain vehicle, comprising:
    a canister which absorbs evaporated fuel from a fuel tank;
    a purge path which connects said canister and an intake system of an engine to each other; and
    a purge controlling section which controls a flow rate of the evaporated fuel from said canister to the intake system of the engine through said purge path,
    wherein the all terrain vehicle includes a steering mechanism having a handlebar and a steering shaft supported on a vehicle body front frame at a front portion of the vehicle body,
    wherein at least said canister is mounted on the vehicle body front frame,
    wherein a radiator is disposed on the vehicle body front frame,
    wherein at least said canister is mounted on a frame member positioned forward of the radiator, wherein at least said canister is mounted on a frame member positioned rearward of the steering shaft, and wherein at least said canister is mounted on the frame member in the proximity of the intake system of the engine and rearward of the steering shaft.

9. The evaporated fuel controlling apparatus for the all terrain vehicle according to claim 8, wherein at least said canister is mounted on the frame member between the steering shaft and the fuel tank.

* * * * *